(12) United States Patent
Li et al.

(10) Patent No.: US 10,266,142 B2
(45) Date of Patent: Apr. 23, 2019

(54) AUTOMOBILE STEERING WHEEL

(71) Applicant: Autoliv Development AB, Vårgårda (SE)

(72) Inventors: Chunyu Li, Shanghai (CN); Songlin Bu, Shanghai (CN); Zhiyong Jiang, Shanghai (CN)

(73) Assignee: Autoliv Development AB, Vargarda (SE)

( * ) Notice: Subject to any disclaimer, the term of this patent is extended or adjusted under 35 U.S.C. 154(b) by 12 days.

(21) Appl. No.: 15/325,738

(22) PCT Filed: May 13, 2015

(86) PCT No.: PCT/CN2015/078854
§ 371 (c)(1),
(2) Date: Jan. 12, 2017

(87) PCT Pub. No.: WO2016/008331
PCT Pub. Date: Jan. 21, 2016

(65) Prior Publication Data
US 2017/0166156 A1     Jun. 15, 2017

(30) Foreign Application Priority Data

Jul. 15, 2014 (CN) .......................... 2014 1 0336535

(51) Int. Cl.
*B60R 21/203* (2006.01)
*B62D 1/04* (2006.01)

(52) U.S. Cl.
CPC ........ *B60R 21/203* (2013.01); *B60R 21/2035* (2013.01); *B62D 1/04* (2013.01)

(58) Field of Classification Search
CPC ............ B60R 21/2037; B60R 21/2035; B60R 21/203; B62D 1/04; B60Q 5/003; B60Q 5/00

(Continued)

(56) References Cited

U.S. PATENT DOCUMENTS 7,556,282 B2 * 7/2009 Vigeant ............... B60R 21/2035
280/728.2
8,500,156 B2 8/2013 Banno et al.
(Continued)

FOREIGN PATENT DOCUMENTS

CN 102442269 A 5/2012
CN 102811890 A 12/2012
(Continued)

OTHER PUBLICATIONS

International Search Report for PCT/CN2015/078854, ISA/CN, Haidian District, Beijing, dated Aug. 5, 2015.
(Continued)

*Primary Examiner* — Keith J Frisby
(74) *Attorney, Agent, or Firm* — Stephen T. Olson; Harness, Dickey & Pierce, P.L.C.

(57) ABSTRACT

A steering wheel of a vehicle includes a steering wheel armature made of metal, a steering wheel rear cover made of plastic, and an airbag module. The steering wheel rear cover is located on a bottom of the steering wheel armature and the airbag module is mounted above the steering wheel armature. An Ω spring assembles the airbag module onto the armature. At least a supporting rib extends from the steering wheel rear cover and is located between the Ω spring and the steering wheel armature for supporting the Ω spring. The supporting rib erases a gap between the Ω spring and the steering wheel armature and it is formed by plastic, thereby reducing noise efficiently.

13 Claims, 2 Drawing Sheets

(58) Field of Classification Search
USPC .............. 280/731, 728.2; 200/61.54, 61.55; 74/552
See application file for complete search history.

(56) References Cited

U.S. PATENT DOCUMENTS

2003/0173759 A1    9/2003   Grenier
2012/0080868 A1    4/2012   Banno et al.
2012/0313357 A1   12/2012   Yamaji et al.

FOREIGN PATENT DOCUMENTS

| CN | 203472779 U | 3/2014 |
|----|-------------|--------|
| EP | 1103430 A1 | 5/2001 |
| GB | 20020004907.0 | 4/2002 |
| JP | 5015261 B2 | 8/2012 |

OTHER PUBLICATIONS

Written Opinion of the ISA for PCT/CN2015/078854, ISA/CN, Haidian District, Beijing, dated Aug. 5, 2015.

\* cited by examiner

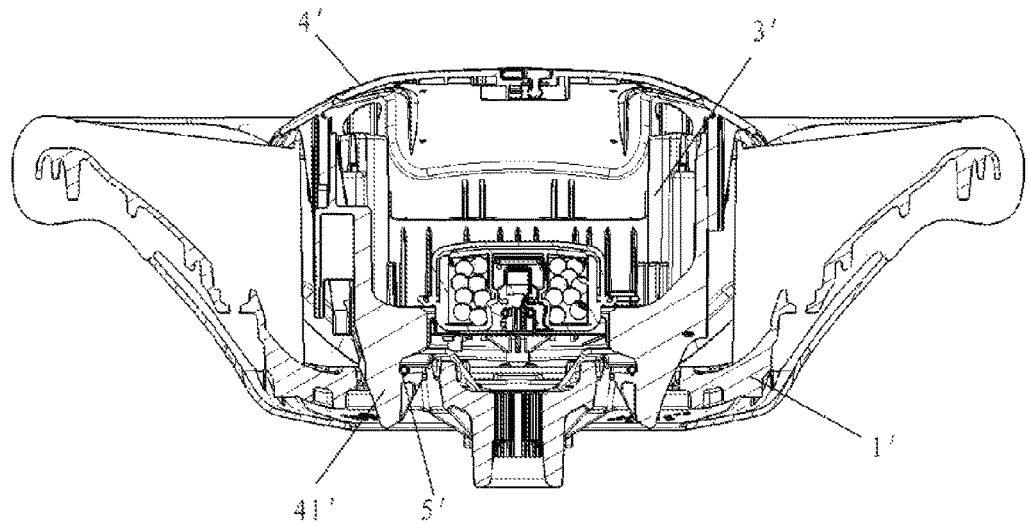
*Figure 1 – PRIOR ART*
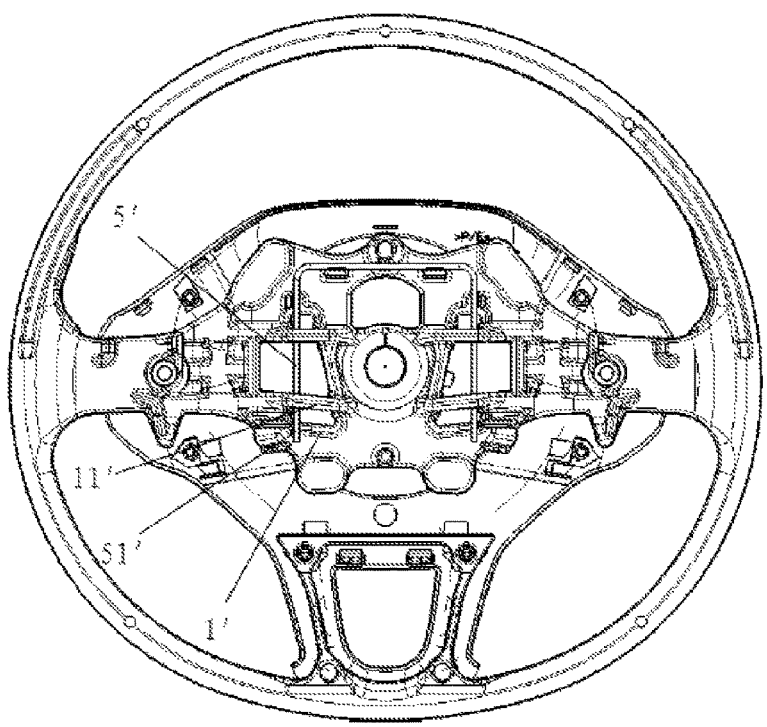
*Figure 2 – PRIOR ART*

AUTOMOBILE STEERING WHEEL

CROSS-REFERENCE TO RELATED APPLICATIONS

This application is a 371 U.S National Stage of International Application No. PCT/CN2015/078854, filed May 13, 2015,which claims the benefit of and priority to Chinese Patent Application No. 201410336535.6, filed Jul. 15, 2014. The entire disclosures of the above applications are incorporated herein by reference.

TECHNICAL FIELD

The present disclosure relates to the technical field of a vehicle, and in particular relates to a steering wheel for a vehicle.

BACKGROUND ART

A steering wheel of a vehicle comprises a steering wheel armature and a driver airbag (referred to as DAB) mounted on the steering wheel armature. The DAB comprises a DAB module (e.g. an airbag module 3' shown in FIG. 1) and a DAB decoration cover (e.g. an airbag decoration cover 4' shown in FIG. 1), wherein the driver airbag module is covered by the airbag decoration cover. The DAB decoration cover is a plastic member located at the center of the steering wheel armature. When an airbag is deployed due to a collision, the DAB decoration cover would be broken.

As shown in FIG. 1, typically the interface between DAB and the steering wheel armature is achieved by a hook 41' of the DAB decoration cover 4' clamping a Ω spring 5' mounted on the steering wheel armature 1'. As shown in FIG. 2, the steering wheel armature 1' provides a spring stopping bridge 11' for restraining the Ω spring 5'.

In order to assemble the Ω spring 5' onto the steering wheel armature 1' conveniently, usually a gap of 0.3 mm is existed at a mating space between the spring stopping bridge 11' and the Ω spring 5'. Due to such a gap, a displacement of the Ω spring 5' would occur in use. When the Ω spring 5' is engaged with the DAB module are mated with each other, this displacement would lead to a noise caused by the Ω spring 5' contacting the spring stopping bridge 11'.

Therefore, it has become necessary to design a steering wheel of a vehicle which can reduce the noise.

SUMMARY

The present disclosure aims to overcome the defects in the prior art, and provides a vehicle steering wheel for reducing noise.

A technical solution of the present disclosure provides a steering wheel of a vehicle, comprising a steering wheel armature made of metal, a steering wheel rear cover made of plastic, and an airbag module, wherein, the steering wheel rear cover is located on a bottom of the steering wheel armature, the airbag module is mounted above the steering wheel armature;

an Ω spring is assembled onto the steering wheel armature, two hooks extend downward from the airbag module inserting into the steering wheel armature, and two free ends of the Ω spring are engaged with the two hooks, at least a supporting rib extends from the steering wheel rear cover and is located between the Ω spring and the steering wheel armature for supporting the Ω spring.

Preferably, a spring clamping groove and a spring stopping bridge is provided on the steering wheel armature, and the Ω spring comprises a middle section hung on the spring clamping groove, two side sections pressed by the spring stopping bridge, and two free ends contacting the supporting rib.

Preferably, there exist four spring stopping bridges, wherein every two spring stopping bridges press one side section of the Ω spring.

Preferably, the supporting ribs extend from the steering wheel rear cover, and extend above the steering wheel armature.

Preferably, the steering wheel armature has inserting holes into which the hooks insert, and the inserting holes provide a space for the extension of the supporting rib.

Preferably, the supporting rib is in the shape of a long strip.

Preferably, two supporting ribs extend from the back cover to support the two free ends of the Ω spring respectively.

The above technical solution can achieve the following beneficial technical effects: as the supporting ribs extend from the steering wheel and are located between the Ω spring and the steering wheel armature, they can reduce the possibility of the displacement of the Ω spring due to the gap between the Ω spring and the steering wheel armature. Further, the supporting rib is formed of plastic, therefore, even if the Ω spring contacts the steering wheel armature, the noise caused by the contact will be very slight, to efficiently solve the issue of large noise.

BRIEF DESCRIPTION OF THE DRAWINGS

FIG. 1 is a cross-section of the prior vehicle steering wheel;

FIG. 2 is a top view of a steering wheel armature in a prior vehicle steering wheel;

| List of Reference numbers | |
|---|---|
| 1'-steering wheel armature | 3'-airbag module |
| 4'-DAB decoration cover | 5'-Ω spring |
| 11'-spring stopping bridge | 41'-hook |
| 51'-free end | 1-steering wheel armature |
| 2-steering wheel rear cover | 5-Ω spring |
| 11-clamping groove | 12-spring stopping bridge |
| 13-inserting hole | 21-rib |
| 51-free end | 52-middle section |
| 53-side section | |

DETAILED DESCRIPTION OF THE EMBODIMENTS

Hereinafter, several embodiments of the present disclosure would be illustrated in detail by referring to the accompanying drawings.

The present disclosure mentions some directions, such as "vertical", "horizontal", "upper", "lower", "left", "right" or the like, which mean the orientations of the steering wheel mounted on the vehicle.

Figure 3:
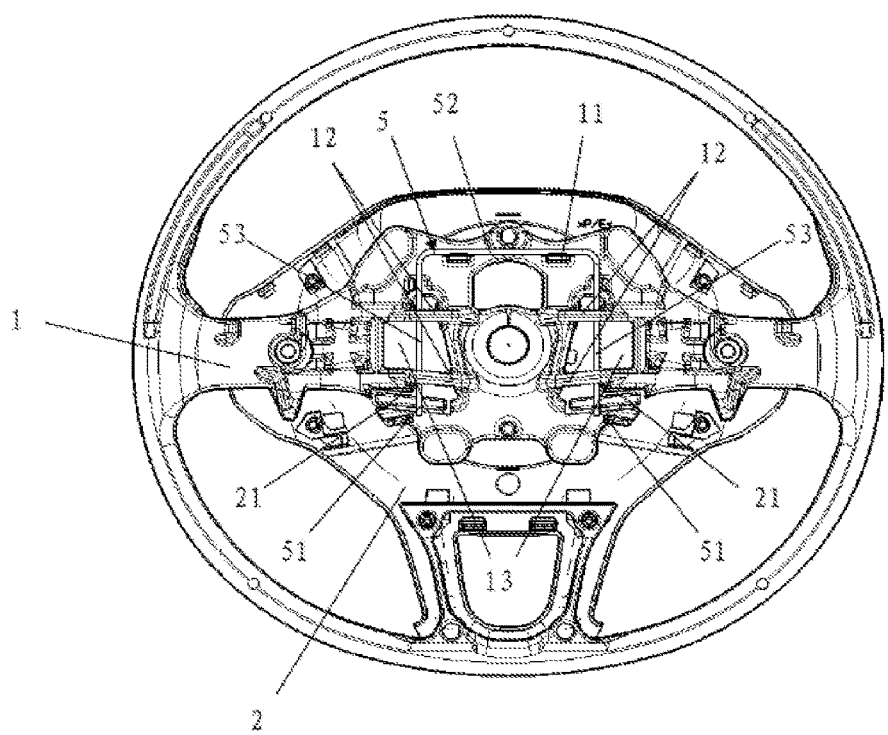
FIG. 3 is a top view of a steering wheel armature in a vehicle steering wheel according to one embodiment of the present disclosure.
Figure 4:
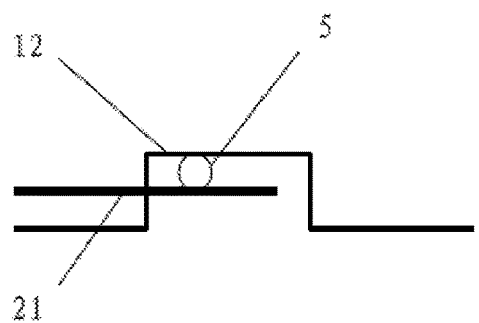
FIG. 4 is a principal scheme of a vehicle steering wheel with ribs supporting an Ω spring according to one embodiment of the present disclosure.

As shown in FIGS. 3-4, the steering wheel comprises a steering wheel armature 1 made of metal, a steering wheel rear cover 2 made of plastic, an airbag module and an airbag decoration cover. The steering wheel rear cover 2 is located at a bottom of the steering wheel armature 1. The airbag module is mounted onto the steering wheel armature 1, and is located above the steering wheel armature 1. The airbag decoration cover is used to package the airbag module, and is located at a central position above the steering wheel armature 1. A Ω spring 5 is assembled on the steering wheel armature 1. Two hooks (not shown) extend downwards from the airbag module. These two hooks insert into inserting holes 13 in the steering wheel armature 1. The Ω spring 5 has two side sections 53, which engage with the two hooks respectively. At least one supporting rib 21 extends from the steering wheel rear cover 2 and is located below the Ω spring 5 to support the Ω spring 5.

The hooks insert into the steering wheel armature 1 in order to assemble the airbag module onto the steering wheel armature 1. The hooks comprise barbs, which insert into the inserting holes 13 so that the airbag module is locked with the steering wheel armature 1 in a vertical direction. The side sections 53 of the Ω spring 5 are clamped within the barbs of the hooks, and then the two hooks would restrain the Ω spring 5. Under this circumstance, the airbag decoration cover will be locked in a horizontal direction by an elastic force caused by the Ω spring 5, to prevent the airbag module from swinging in the horizontal direction.

Regarding the interface between the airbag module and steering wheel armature according to the present invention, the airbag module and the hooks, it can be understood by referring to the prior art interface between the airbag decoration cover 4', the airbag module 3' and the hooks 41' as shown in FIG. 1. The airbag decoration cover covers the airbag module, and the hook is configured to extend from the airbag module.

As shown in FIG. 2, a gap is existed between two free ends 51' of the current Ω spring 5' and the spring stopping bridge 11', so the contact of the Ω spring 5' with the spring stopping bridge 11' may cause the rattle noise. Further, as the Ω spring 5' and the spring stopping bridge 11' both are made of metal, the noise caused by contact of different metal elements, deteriorate the comfortable sensation during the usage of the vehicle.

By comparison, in the embodiment as shown in FIGS. 3-4, as the supporting rib 21 extends from the steering wheel rear cover 2 and is located below the Ω spring 5, the existence of supporting rib makes the Ω spring 5 run upwards to reach the spring stopping bridge 12, that is, by the upward supporting of the rib 21, the gap of 0.3 mm between the Ω spring 5 and the spring stopping bridge 12 will be removed, and an interference fit will be nearly achieved. Under this circumstance, the Ω spring 5 will not swing up and down, thereby avoiding the noise. Furthermore, the supporting rib 21 is formed of plastic, therefore, even if a contact occurs between the Ω spring 5 and the supporting rib 21, it occurs between a metal element and a plastic element, and thus the noise is substantially decreased, thereby avoiding the high noise.

In the present embodiment, as shown in FIG. 3, the Ω spring 5 is shaped as a door, i.e. a rectangle frame with an opening on one side.

Preferably, the Ω spring 5 of the present disclosure is not limited in the above shape. In particular, the Ω spring 5 may be near to the shape of "Ω", i.e. its main body is in an arc shape, and its two free ends are bent respectively to form short sides.

Preferably, as shown in FIG. 3, the steering wheel armature 1 provides a spring clamping groove 11 and a spring stopping bridge 12. The Ω spring 5 comprises a middle section 52 which is hung on the spring clamping groove 11, two side sections 53 which are restrained by the spring stopping bridge 12, and two free ends 51 which contact the supporting rib 21. When the Ω spring 5 is mounted, the two free ends 51 of the Ω spring 5 go through below the spring stopping bridge 12, and then the middle section 52 of the Ω spring 5 is hung on the spring clamping groove 11. After the assembling, the two side sections 53 of the Ω spring 5 are restrained by the spring stopping bridge 12, and a gap is existed between the two free ends 51 of the Ω spring 5 and the steering wheel armature 1. Two supporting ribs 21 extend from the back cover to support the two free ends of the Ω spring respectively. As supporting ribs 21 are located between the Ω spring 5 and the steering wheel armature 1, the supporting ribs 21 have a function for compensating the gap. The Ω spring 5 directly contacts the ribs 21 at the two free ends 51, so that the supporting ribs 21 can avoid the noise caused by the contact between the two free ends 51 of the Ω spring 5 and the spring stopping bridge 12. After the middle section 52 of the Ω spring 5 is hung on the spring clamping groove 11, the Ω spring 5 is positioned primarily, so as to define the location of the Ω spring 5 in a up-down direction relative to a horizontal plane. The two side sections 53 of the Ω spring 5 are restrained by the spring stopping bridge 12, to define a motion range of the Ω spring 5 in a left-right direction relative to a vertical plane. When the Ω spring 5 is assembled onto the steering wheel armature 1 in an initial state, the hooks have not inserted into the steering wheel armature 1 at this time, and there is still a larger distance between the two side sections 53 of the Ω spring 5. After the hooks insert into the steering wheel armature 1, the two side sections 53 of the Ω spring 5 are compressed, and said distance is decreased.

In the present embodiment, as shown in FIG. 3, there exist four spring stopping bridges 12, wherein every two spring stopping bridges 12 press one free end 51 on one side of the Ω spring 5.

Preferably, two additional spring stopping bridges 12 may be provided, each one on each of left and right sides. Alternatively, the additional spring stopping bridges 12 may be provided, so that every three are provided on each of left and right sides.

In the present embodiment, as shown in FIG. 3, the ribs 21 extend from the steering wheel rear cover 2, and extend above the steering wheel armature 1. The steering wheel armature 1 form inserting holes 13 into which hooks insert. The inserting holes 13 provide a space for the extension of the ribs 21. The ribs 21 extend from the provided space of the rear cover 2 for the ribs 21, and extend above the steering wheel armature 1. As shown in FIG. 2, the location of the reserved space, within the prior steering wheel armature 1', coincides with the location of the collision with the two free ends 51' of the Ω spring 5'. In the present embodiment, such a portion of the armature has been removed, and a respective space appears for the extension of the ribs.

In the present embodiment, as shown in FIG. 3, the ribs are in the shape of a long strip. Certainly, the supporting rib may be shaped as cuboid, ball or other irregular shapes. As long as the shape of the ribs can assure supporting the Ω spring 5, this shape will fall into the protection scope of the present disclosure.

The illustration as above only focuses on the principle of the present invention and the preferable embodiments thereof. It should be noted that, for the skilled in the art, any other modification based on the principle of the present invention should fall into the protection scope of the present invention.

The invention claimed is:

1. A steering wheel of a vehicle comprising:
a steering wheel armature made of metal;
a steering wheel rear cover made of plastic, the steering wheel rear cover is located on a bottom of the steering wheel armature;
an airbag module mounted above the steering wheel armature with first and second hooks extending downward from the airbag module and inserting into the steering wheel armature; and
a spring provided to assemble the airbag module onto the steering wheel armature, the spring having first and second free ends engaged with the first and second hooks, respectively;
wherein at least one supporting rib for supporting the spring extends from the steering wheel rear cover, the spring located between the supporting rib and the steering wheel armature.

2. The steering wheel of the vehicle of claim 1, wherein a spring clamping groove and a spring stopping bridge are formed on the steering wheel armature, and the spring includes a middle section hung on the spring clamping groove, two side sections pressed by the spring stopping bridge, and two free ends contacting the ribs.

3. The steering wheel of the vehicle of claim 2, comprising four spring stopping bridges, wherein every two spring stopping bridges press one side section of the spring.

4. The steering wheel of the vehicle of claim 1, wherein the steering wheel armature has inserting holes into which the hooks are inserted, and the inserting holes provide a space for extension of the supporting rib.

5. The steering wheel of the vehicle of claim 1, wherein the supporting rib is in the shape of a long strip.

6. The steering wheel of the vehicle of claim 1, wherein the spring is made of metal.

7. The steering wheel of the vehicle of claim 1, wherein two supporting ribs extend from the steering wheel rear cover to support two free ends of the spring, respectively.

8. The steering wheel of the vehicle of claim 1 wherein the steering wheel armature includes a spring clamping groove and at least first and second spring stopping bridges, the spring including a central portion received within the spring clamping groove, the spring further including first and second side sections, the first side section restrained between the first stopping bridge and the at least one supporting rib, the second side section restrained between the second stopping bridge and the at least one supporting rib.

9. A steering wheel of a vehicle comprising:
a steering wheel armature made of metal;
a steering wheel rear cover;
an airbag module mounted above the steering wheel armature with first and second hooks extending downward from the airbag module and inserting into the steering wheel armature;
a spring provided to assemble the airbag module onto the steering wheel armature, the spring including first and second free ends engaged with the first and second hooks, respectively; and
at least one supporting rib from the steering wheel rear cover,
wherein the steering wheel armature includes a spring clamping groove and at least first and second spring stopping bridges, the spring including a central portion received within the spring clamping groove, the spring further including first and second side sections, the first side section restrained between the first stopping bridge and the at least one supporting rib, the second side section restrained between the second stopping bridge and the at least one supporting rib.

10. The steering wheel of the vehicle of claim 9, wherein the steering wheel armature has inserting holes into which the hooks are inserted, and the inserting holes provide a space for extension of the supporting rib.

11. The steering wheel of the vehicle of claim 9, wherein the supporting rib is in the shape of a long strip.

12. The steering wheel of the vehicle of claim 9, wherein the spring is located between the steering wheel rear cover and the steering wheel armature.

13. The steering wheel of the vehicle of claim 9, wherein the steering wheel rear cover is constructed of plastic and the steering wheel armature is constructed of metal.

* * * * *